United States Patent
Broussard, III et al.

(10) Patent No.: US 10,473,237 B2
(45) Date of Patent: Nov. 12, 2019

(54) PUSH RACK PIPE PUSHER FOR FLOATING PIPELINE INSTALLATIONS

(71) Applicant: Broussard Brothers Inc., Abbeville, LA (US)

(72) Inventors: Noah Raywood Broussard, III, Abbeville, LA (US); Frank Andrew Young, Abbeville, LA (US)

(73) Assignee: Broussard Brothers Inc., Abbeville, LA (US)

(*) Notice: Subject to any disclaimer, the term of this patent is extended or adjusted under 35 U.S.C. 154(b) by 0 days.

(21) Appl. No.: 15/973,597

(22) Filed: May 8, 2018

(65) Prior Publication Data

US 2018/0328518 A1 Nov. 15, 2018

Related U.S. Application Data

(60) Provisional application No. 62/503,805, filed on May 9, 2017.

(51) Int. Cl.

| *F16L 1/06* | (2006.01) |
|---|---|
| *E02F 5/00* | (2006.01) |
| *E21B 19/24* | (2006.01) |
| *B65G 15/16* | (2006.01) |
| *E21B 19/08* | (2006.01) |

(52) U.S. Cl.
CPC .............. *F16L 1/06* (2013.01); *E02F 5/00* (2013.01); *E21B 19/24* (2013.01); *B65G 15/16* (2013.01); *E21B 19/08* (2013.01)

(58) Field of Classification Search
CPC ........ B65G 15/10; B65G 15/12; B65G 15/14; B65G 15/16; B21C 1/30; B21C 1/20; F16L 1/06; E02F 5/00; E21B 19/24; E21B 19/22
USPC .......... 198/626.1, 626.3, 626.4, 626.5, 626.6
See application file for complete search history.

(56) References Cited

U.S. PATENT DOCUMENTS

| 2,303,587 | A | * | 12/1942 | Snyder | .................. | B65G 17/061 |
|---|---|---|---|---|---|---|
| | | | | | | 198/626.1 |
| 2,598,190 | A | * | 5/1952 | Offutt | ..................... | B21C 19/00 |
| | | | | | | 100/269.04 |
| 3,620,432 | A | * | 11/1971 | Vernon | .................... | B21C 35/02 |
| | | | | | | 226/172 |
| 4,586,850 | A | * | 5/1986 | Norman | ................... | E02F 5/107 |
| | | | | | | 114/52 |
| 5,094,340 | A | * | 3/1992 | Avakov | ................ | B65G 37/005 |
| | | | | | | 198/604 |
| 7,431,097 | B2 | * | 10/2008 | Weightmann | .......... | B66D 3/003 |
| | | | | | | 166/250.01 |

(Continued)

*Primary Examiner* — William R Harp
(74) *Attorney, Agent, or Firm* — Darryl Edwin Scott (57) ABSTRACT

A push rack pipe pusher having a base. A first frame coupled to the base. A second frame coupled to the base. A first pressurized cylinder coupled to the base. A second pressurized cylinder coupled to the base. A third pressurized cylinder coupled to the base. A fourth pressurized cylinder coupled to the base. A lower track conveyer system coupled to the base and positioned between the first frame and the second frame. An upper track conveyer system coupled to the pressurized cylinders and positioned between the first frame and the second frame. A control unit coupled to the upper track conveyer system, the lower track conveyer system, and the pressurized cylinders.

20 Claims, 5 Drawing Sheets

(56) References Cited

U.S. PATENT DOCUMENTS

| | | | | |
|---|---|---|---|---|
| 7,743,911 B2 * | 6/2010 | Kudrus | ................... | B21C 1/30 |
| | | | | 198/604 |
| 9,541,569 B2 * | 1/2017 | Hundegger | ............... | B27C 1/12 |
| 10,167,140 B2 * | 1/2019 | Eichner | ............... | B21C 47/3458 |
| 2003/0192648 A1 * | 10/2003 | Massarotto | ........... | B29C 44/304 |
| | | | | 156/557 |
| 2018/0328518 A1 * | 11/2018 | Broussard, III | .......... | F16L 1/06 |

* cited by examiner

PUSH RACK PIPE PUSHER FOR FLOATING PIPELINE INSTALLATIONS

CROSS-REFERENCE TO RELATED APPLICATIONS

This application claims the benefit of U.S. Provisional Application No. 62/503,805, filed May 9, 2017.

BACKGROUND

Pushing pipe is commonly practiced in pipe line installations and is completed through various techniques. Pushing pipe using wenches and cables (i.e., pulling equipment) is typically used in the oil and gas industry when installing various size pipelines. Alternatively, a pipe pusher uses a track system on which a pipe is coupled to the single arm track system. The pipe pusher uses either tension or hydraulic pressure to push the pipe forward a couple miles at a time. Automatically redirecting the pipe along with the pipe pusher, reversing the pipe, directing the pipe into a curve, or pushing the pipe more than a few miles in a continuous motion is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The push rack pipe pusher system (hereinafter referred to as "pipe pusher") described herein uses a different mechanism of pushing pipe than what is commonly known in the industry. The pipe pusher may include a removable upper track conveyer system and a lower track conveyer system that operates independently of each other or in concert with one another. The upper and lower track conveyer system may also include a spring system. In one or more embodiments, once the upper track conveyer system is in contact with a pipe lying on the lower track conveyer system (i.e., the upper track conveyer system and the lower track system clamps the pipe), the spring system may be engaged to create more pressure to guide the pipe being pushed. In one or more embodiments, if the upper track conveyer system is removed, the lower track conveyer system acts as a conveyor belt for the pipe. The pipe pusher can push pipes with diameters as small as two inches (5.1 cm) and as large as 44 inches (112 cm). In one or more embodiments, the upper track conveyer system is not required and may be less effective for pipes with smaller diameters.

In one or more embodiments, the pipe pusher has pressurized cylinders for lifting and lowering the upper track conveyer system onto the pipe. The pressurized cylinders may be connected to an engine system (i.e. motor) and control operation unit, creating a safer environment for the operators. The design of the pipe pusher, along with the engine system, allows pipes to be pushed as far as nine miles (14.484 km) in a continuous motion. The operators are also able to reverse the motion of the pipe and go uphill. The pipe pusher can be disassembled for easier transfer and mobility.

Figure 1:
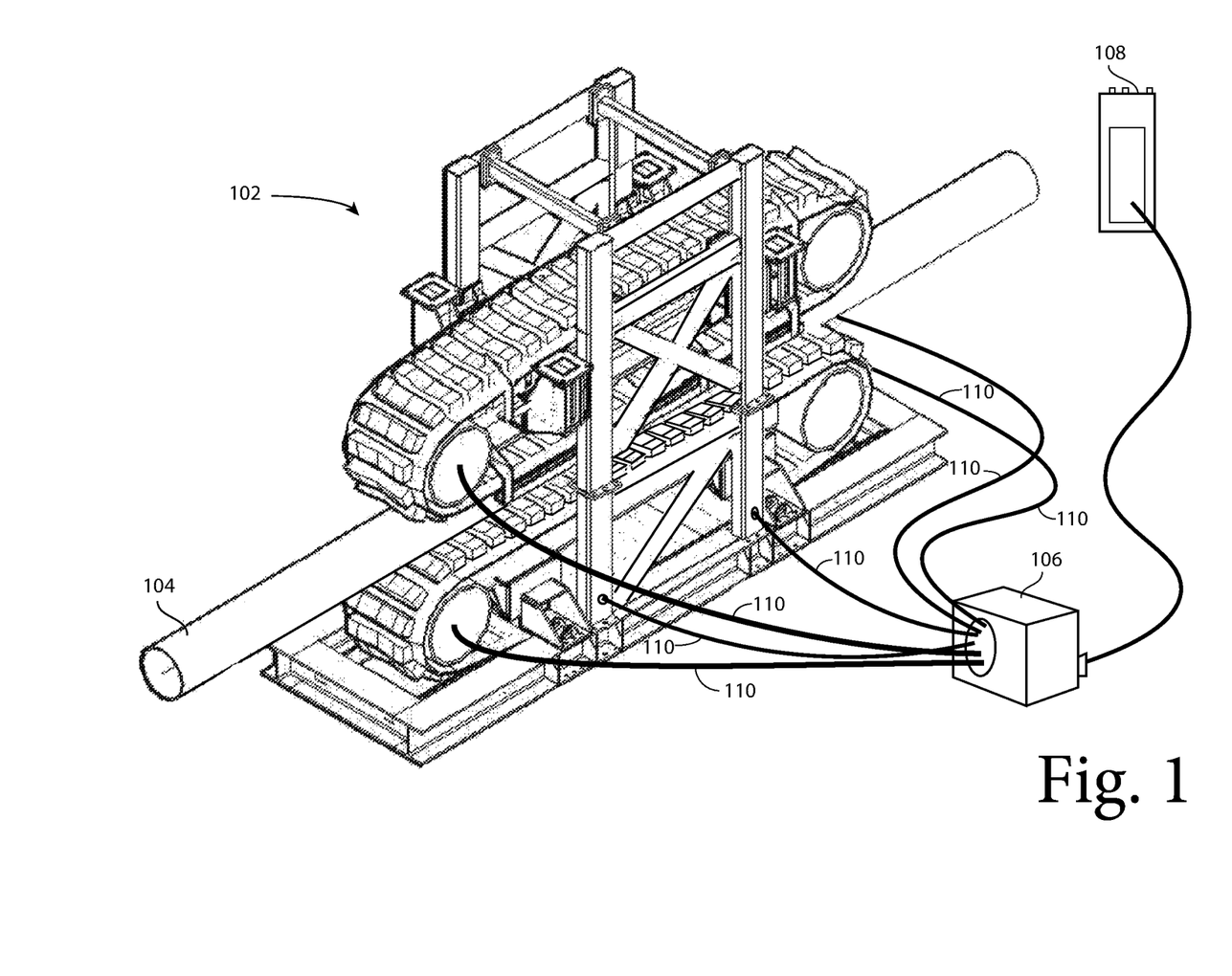
FIG. 1 is a perspective view of a push rack pipe pusher system having a pipe, a motor, and a control operation unit.

FIG. 1 is a perspective view of a push rack pipe rack pusher system having a pipe, a motor, and a control operation unit. As illustrated and described above, the embodiment may include a pipe pusher 102 and a pipe 104. In one more embodiments, the pipe pusher 102 may be coupled to a control unit 106. The motor 108 may be gas-powered or electric-powered. In one more embodiments, the motor 108 may be coupled to a control operation unit 106 to operate the pipe pusher 102. The control operation unit 108 and the motor 106 may be coupled to the pipe pusher using conduit or hoses 110.

Figure 2:
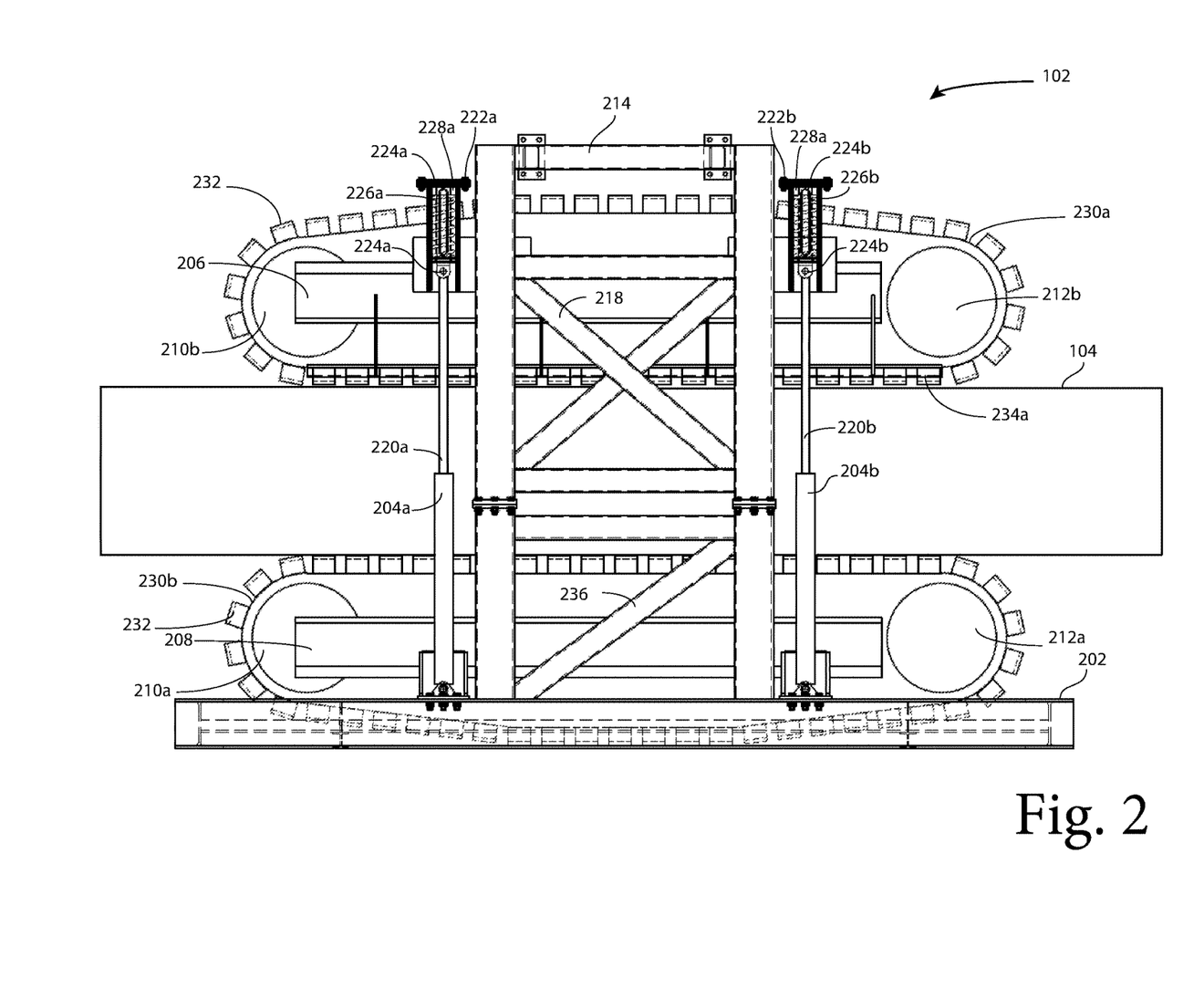
FIG. 2 is a plan view of a push rack pipe pusher system having a pipe.
Figure 3:
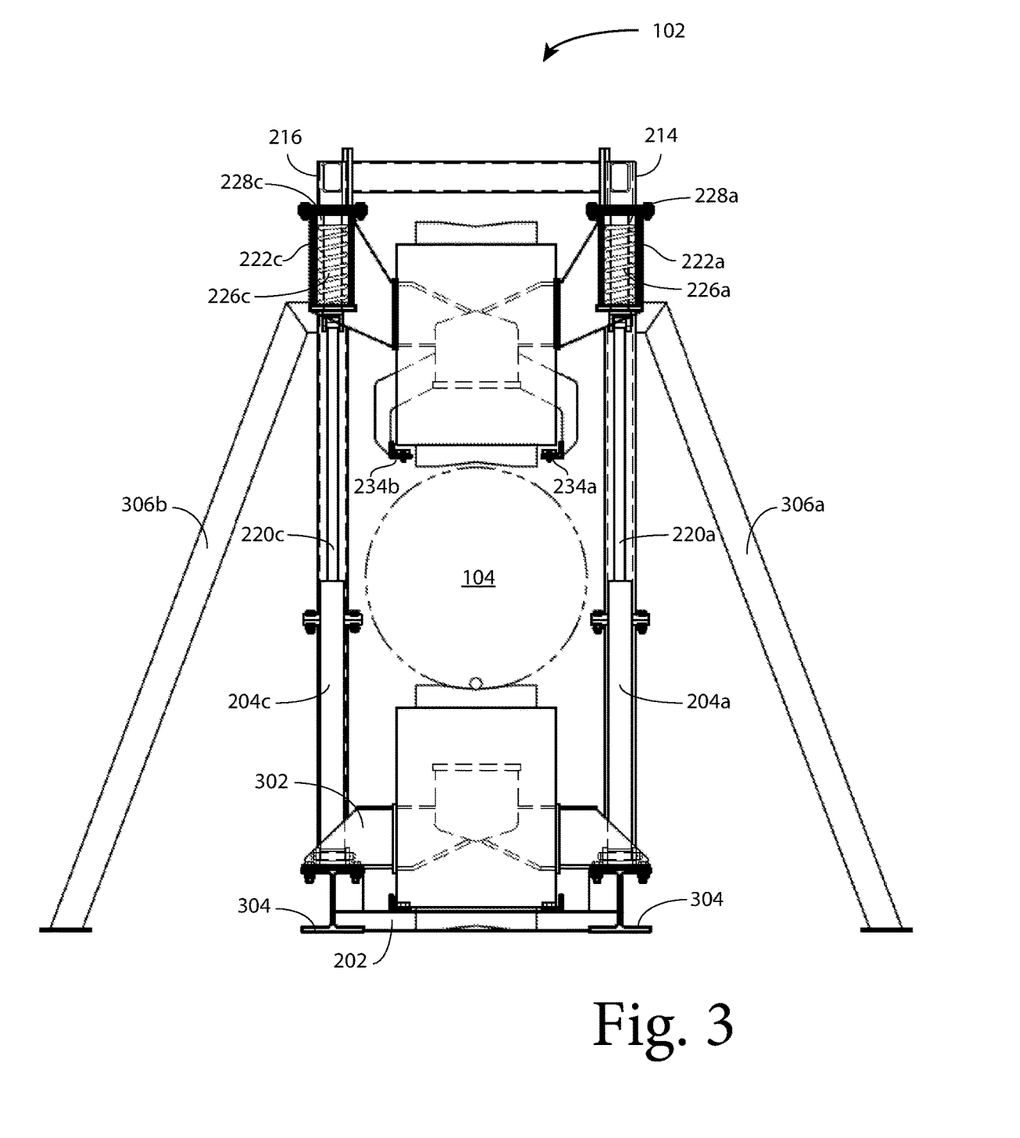
FIG. 3 is a profile view of a push rack pipe pusher having a pipe.

FIG. 2 is a plan view of a push rack pipe pusher system having a pipe. FIG. 3 is a profile view of a push rack pipe pusher having a pipe. In one or more embodiments, the pipe pusher 102 includes a base 202. The base 202 holds and supports the push pipe system 102 and may be made from a metal alloy. The base 202 may be coupled to a plurality of pressurized cylinders 204 (illustrated as 204a and 204b in FIG. 2 and illustrated as 204a and 204c in FIG. 3). Although FIG. 2 and FIG. 3 shows two pressurized cylinders 204, the pipe pusher system 102 has at least four pressurized cylinders 204. In one or more embodiments, two pressurized cylinders 204 are coupled to one side of the base 202 and the other two pressurized cylinders 204 are coupled to the other side of the base 202. The pressurized cylinders 204 may include pneumatic cylinders. The pressurized cylinders may include hydraulic cylinders.

As illustrated in FIG. 3, the base 202 may include a pad eye 302 positioned between two pressurized cylinders 204. For example, the pad eye 302 may sit between pressurized cylinders 204a and 204b and pressurized cylinders 204c and 204d (pressurized cylinder 204d is not visible in FIG. 2 and FIG. 3). In another embodiment, the base 202 is connected to a set of pneumatic cylinders (not shown) by the pad eye 302. In this embodiment, the pneumatic cylinder (not shown) may have hoses connected to an air compressor (not shown) separate from the pipe pusher 102 with its own engine. The air compressor (not shown) connects to the control operation unit 106 through the same motor 108 that is connected to a lower track conveyer system 208. In one or more embodiments, the lower track conveyer system 208 is coupled to the base 202. The control operation unit 106 has a separate panel to control the air compressor (not shown) and pneumatic cylinder (not shown).

In one or more embodiments, as illustrated in FIG. 2, the pipe pusher 102 may include an upper track conveyer system 206 and a lower track conveyer system 208. In one or more embodiments, the pressurized cylinders 204 are used to raise and lower the upper conveyer track systems 206. Conduits or hoses (not shown in FIGS. 2 and 3, but illustrated in FIG. 1 as 110) may be plugged into the pressurized cylinders 204 that connects the pressurized cylinders 204 to the control unit 106 placed away from the pipe pusher 102. The engine may be an electric engine or gas-powered engine.

In one or more embodiments, one end of the upper track conveyer system 206 and lower track conveyer system 208 each contain a hydraulic motor 210 (illustrated in FIG. 2 as 210a and 210b). The hydraulic motors 210a and 210b power the upper track conveyer system 206 and the lower track conveyer system 208 independently and in concert. The conduit 110 (not illustrated in FIGS. 2 and 3, but are illustrated in FIG. 1) may be plugged into each of the hydraulic motors 210 connecting both the upper track conveyer system 206 and lower track conveyer system 208 to the control unit 106 and the motor unit 108 (not illustrated in FIGS. 2 and 3, but are illustrated in FIG. 1) several feet away from the pipe pusher 102.

In one or more embodiments, the other end of the upper track conveyer system 206 and lower track conveyer system 208 includes an idler wheel 212 (illustrated as 212a and 212b) that spins freely and allow the conveyer track systems (i.e., upper track conveyer system 206 and lower track conveyer system 208) to stay in motion. The control operation unit 106 may be connected to the motor 108 that is used by an operator to control the movement, direction, speed, and pressure of the pipe pusher 102.

In one or more embodiments, the base 202 is coupled to a first frame 214 and a second frame 216 (not visible in FIG. 2, but illustrated in FIG. 3). As illustrated in FIG. 2, the first frame 214 may be welded together using a cross beam 218 to create structural support for guiding the upper track conveyer system 206. Although not visible in FIG. 2, and moderately visible in FIG. 1, the second frame 216 is welded together using a second cross beam (similar to cross beam 218) to provide structural support for guiding the upper track conveyer system 206. Further, the lower track conveyer system 208 may be coupled and positioned between the first frame 214 and the second frame 216. In one or more embodiments, the pressurized cylinders 204 are coupled to the upper track conveyer system 206 by means of a spring system (described below).

In one or more embodiments, the upper track conveyer system 206 is connected to frame guides (not visible). The frame guides allow the upper track conveyer system 206 to move smoothly along the first frame 214 and second frame 216 when being lowered onto the pipe 104 or onto the lower track conveyer system 208. In one or more embodiments, the upper track conveyer system 206 is coupled between the first frame 214 and the second frame 216. In one or more embodiments, the upper track conveyer system 206 is coupled to the pressurized cylinders 204.

In one or more embodiments, the pressurized cylinders 204 each are coupled to a separate hydraulic ram 220 (illustrated in FIG. 2 as 220a and 220b and FIG. 3 as 220a and 220c) that extends and descends when the pressurized cylinders 204 are activated by the control unit 106. In one or more embodiments, the hydraulic rams 220 are connected to a spring system 222 (illustrated in FIG. 2 as 222a and 222b and FIG. 3 as 222a and 222c) by a pin 224 (illustrated in FIG. 2 as 224a and 224b). Note, each pressurized cylinder 204 includes a spring system 222 connected by a pin 224.

In one or more embodiments, the spring system 222 includes a spring 226 (illustrated in FIG. 2 as 226a and 226b and FIG. 3 as 226a and 226c) enclosed in a housing 228 (illustrated in FIG. 2 as 228a and 228b and FIG. 3 as 228a and 228c). The spring system 222 may be controlled by the control operation unit 106 (not illustrate in FIGS. 2 and 3, but illustrated in FIG. 1) through a connection to the hydraulic ram 220. The spring system 222 may have various level of compression that creates enough friction to move the pipe 104 along the conveyer system without slipping. When the spring 226 is compressed using the control operation unit 106, the hydraulic ram 220 coupled to the pressurized cylinder 204 is pushed down resulting in the upper track conveyer system 206 descending onto the pipe 104. In one or more embodiments, the spring systems 222 are coupled to the upper track conveyer system 206.

In another embodiment, the upper track conveyer system 206, the pressurized cylinders 204 are removable. In this configuration, the lower track conveyer system 208 pushes (i.e. similar to an object being transported on a conveyer belt system) the pipe 104 using the hydraulic motor system 210a.

In one or more embodiments, the lower track conveyer system 208 and the upper track conveyer system 206 each has a metal conveyer belt 230 (illustrated as 230a for the upper track conveyer system 206 and as 230b for the lower track conveyer system 208) that is bolted together with rubber pads 232 welded to the metal conveyer belt 230. Although, FIG. 2 shows a specific number of rubber pads 232 it is not to be interpreted as having a limited number of rubber pads 232 but may have a greater or fewer number of rubber pads 232 The rubber pads 232 cushion and grip the pipe 104 that is being pushed by both the lower track conveyer system 208 and upper track conveyer system 206. In one or more embodiments, the rubber pads 232 are made from neoprene, plastic, or similar material that has a cushioning and gripping properties.

In one or more embodiments, hanging supports 234 (illustrated in FIG. 2 as 234a and FIG. 3 as 234a and 234b) are welded to the upper track conveyer system 206 to provide more support to ensure no sagging of the metal conveyer belt 230a coupled to the upper track conveyer system 206.

As illustrated in FIG. 2, a lower cross beam 236 may be welded to base 202, the first frame 214, and second frame 216 to create more support for the lower track conveyer system 208. As illustrated in FIG. 3, the pipe pusher 102 can be welded to a steel surface through a base support 304 or supported on the ground by support stands 306a and 306b. The support stands 306 may be bolted to the first frame 214 and the second frame 216 and can be added or removed from the pipe pusher 102, as needed.

The pipe pusher 102 may hold and push various pipe sizes ranging in sizes from 2 inches (5.08 cm) to 20 inches 50.8 cm). When using smaller pipes, the upper track conveyer system 206 may be removed leaving the lower track conveyer system 208 to lay the pipe 104 alone. In the case of a larger pipe, the upper track conveyer system 206 is slowly lowered to the top of the pipe by the control operation unit 108.

Figure 4:
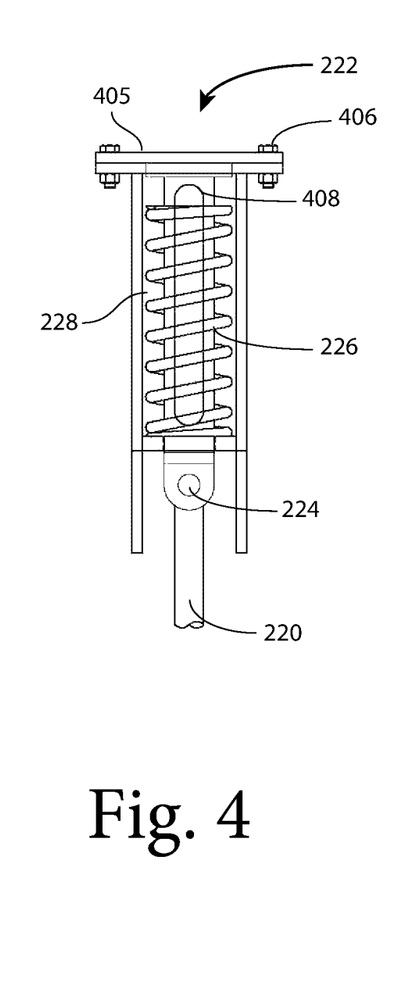
FIG. 4 is a semi-transparent plan view of a spring system in a normal position.
Figure 5:
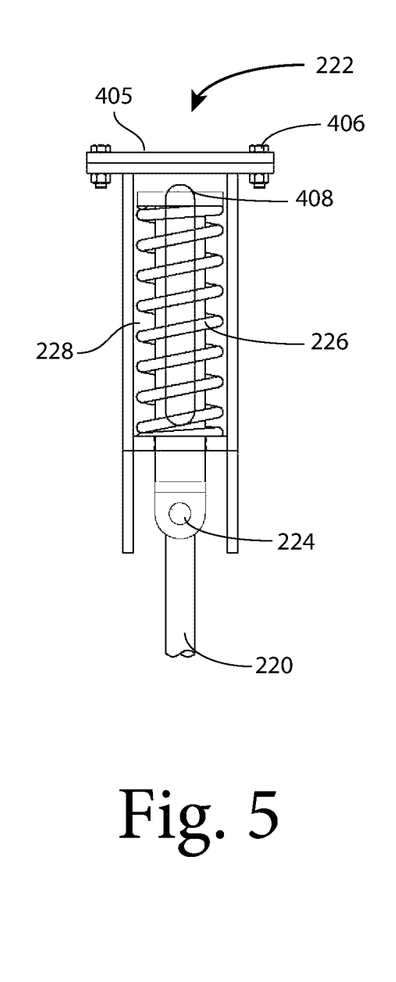
FIG. 5 is a semi-transparent plan view of a spring system in a semi-compressed position.
Figure 6:
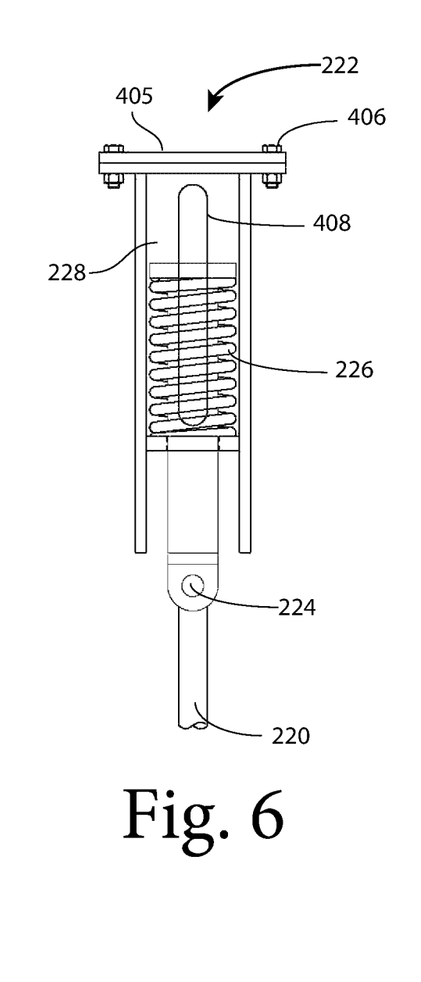
FIG. 6 is a semi-transparent plan view of a spring system in a fully compressed position.

FIG. 4 is a semi-transparent plan view of a spring system in a normal position. FIG. 5 is a semi-transparent plan view of a spring system in a semi-compressed position, and FIG. 6 is a semi-transparent plan view of a spring system in a fully compressed position. In or more embodiments, the spring system 222 may include a metal plate 405, the pin 224, the spring 226, the housing 228, the hydraulic ram 220, and a bolt 406. As described above in connection to FIGS. 2 and 3, the housing 228 is a box that surrounds spring 226 and has a window 408 that shows the movement of spring system 222. In one or more embodiments, the housing 228 does not have a window 408. In another embodiment, the housing 228 has the window 408 that shows the movement of shock absorbers (not shown) or small ram (not shown) made of a hydraulic compression material that uses the hydraulic pressure within the system to apply more pressure on the pipe 104.

In one more embodiments, the spring system 222 has shock absorbers on core (not shown) to apply pressure on the pipe 104. The housing 228 surrounds the shock absorber system. In one more embodiments, the metal plate 405 is bolted to the housing 228. If necessary to remove any item in housing 228, the metal plate 405 can be unscrewed and removed. In one or more embodiments, the spring system 222 is welded to the upper track conveyer system 206, so that it is removed along with the upper track conveyer system 206 when the upper track conveyer system 206 and lower track conveyer system 208 are separated.

As illustrated in FIGS. 4-6, the metal plate 405 may be attached to the spring 226. The metal plate 405 may assist the spring 226 in lowering the upper track conveyer system 206 onto the pipe 104. As illustrated in FIG. 6, the spring 226 is in a fully compressed position (i.e., the spring system 222 is applying the full force of the upper track conveyer system 206 onto the pipe 104.)

Figure 7:
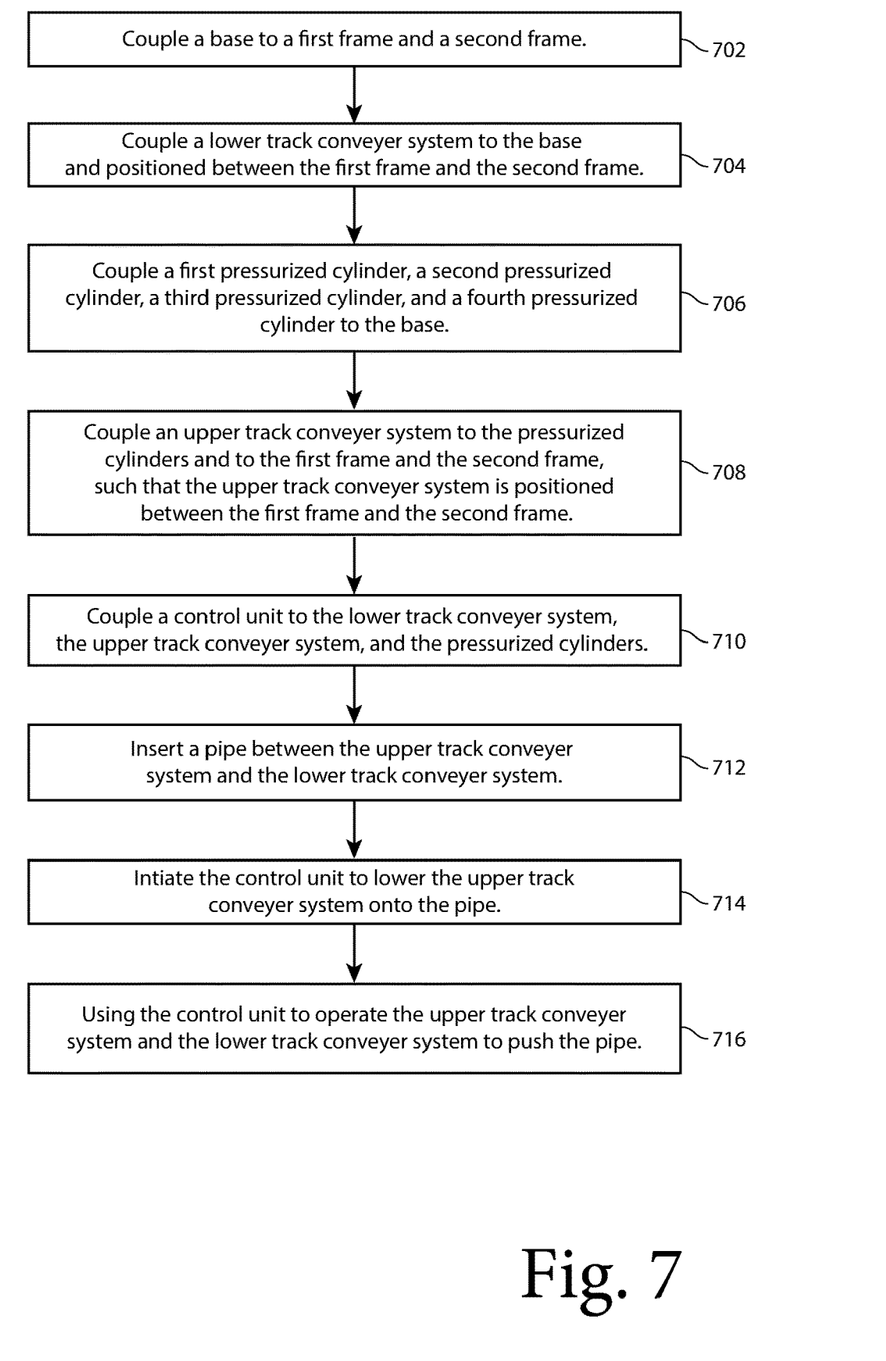
FIG. 7 is a flow chart of a method of pushing a pipe.

FIG. 7 is a flow chart of a method of pushing a pipe. In operation, a base (such as base 202) is coupled to a first frame (such as first frame 214) and a second frame (such as second frame 216) (block 702). A lower track conveyer system (such as lower track conveyer system 208) is coupled to the base (such as base 202) and positioned between the first frame (such as first frame 214) and the second frame (such as second frame 216) (block 704). A first pressurized cylinder (such as pressurized cylinder 204a), a second pressurized cylinder (such as pressurized cylinder 204b), a third pressurized cylinder (such as pressurized cylinder 204c), and fourth pressurized cylinder are coupled to the base (such as base 202) (block 706). An upper track conveyer system (such as upper track conveyer system 206) is coupled to the pressurized cylinders (such as pressurized cylinders 204) and to the first frame (such as first frame 214) and the second frame (such as second frame 216), such that the upper track conveyer system (such as upper track conveyer system 206) is positioned between the first frame (such as first frame 214) and the second frame (such as second frame 216) (block 708). A control unit (such as control 106) is coupled to the lower track conveyer system (such as lower track conveyer system 208), the upper track conveyer system (such as upper track conveyer system 206), and the pressurized cylinders (such as pressurized cylinders 204) (block 710). A pipe (such as pipe 104) is inserted between the upper track conveyer system (such as upper track conveyer system 206) and the lower track conveyer system (such as lower track conveyer system 208) (block 712). The control unit (such as control unit 106) is initiated to lower the upper track conveyer system (such as upper track conveyer system 206) onto the pipe (such as pipe 104) (block 714). The control unit (such as control unit 106) is used to operate the upper track conveyer system (such as upper track conveyer system 206) and the lower track conveyer system (such as lower track conveyer system 208) to push the pipe (such as pipe 104) (block 716).

In one aspect, the pipe rack pipe pusher includes a base. A first frame is coupled to the base. A second frame is coupled to the base. A first pressurized cylinder is coupled to the base. A second pressurized cylinder is coupled to the base. A third pressurized cylinder is coupled to the base. A fourth pressurized cylinder is coupled to the base. A lower track conveyer system is coupled to the base and positioned between the first frame and the second frame. An upper track conveyer system is coupled to the pressurized cylinders and positioned between the first frame and the second frame. A motor is coupled to the upper track conveyer system, the lower track conveyer system, and the pressurized cylinders.

Implementation may include one or more of the following. A first spring system may be coupled to the upper track conveyer system and the first pressurized cylinder. A second spring system may be coupled to the upper track conveyer system and the second pressurized cylinder. A third spring system may be coupled to the upper track conveyer system and the third pressurized cylinder. A fourth spring system may be coupled to the upper track conveyer system and the fourth pressurized cylinder. The first pressurized cylinder and the second pressurized cylinder may be coupled to the first frame. The third pressurized cylinder and the second pressurized cylinder may be coupled to the second frame. The base may include a pad eye. The upper track conveyer system may include an upper metal conveyer belt having an array of gripping pads. The lower track conveyer system may include an upper metal conveyer belt having an array of gripping pads.

In one aspect, the method of pushing a pipe includes coupling a base to a first frame a second frame. A lower track conveyer system is coupled to the base and positioned between the first frame and the second frame. A first pressurized cylinder, a second pressurized cylinder, a third pressurized cylinder and a fourth pressurized cylinder are coupled to the base. An upper track conveyer system is coupled to the pressurized cylinders and the first frame and the second frame, such that the upper track conveyer system is positioned between the first frame and the second frame. A motor is coupled to the lower track conveyer system, the upper track conveyer system, and the pressurized cylinders. A pipe is inserted between the upper track conveyer system and the lower track conveyer system. A motor is initiated to lower the upper track conveyer system onto the pipe. The control unit is used to operate the upper track conveyer system and the lower track conveyer system to push the pipe.

Implementation may include one or more of the following. A first spring system may be coupled to the upper track conveyer system and the first pressurized cylinder. A second spring system may be coupled to the upper track conveyer system and the second pressurized cylinder. A third spring system may be coupled to the upper track conveyer system and the third pressurized cylinder. A fourth spring system may be coupled to the upper track conveyer system and the fourth pressurized cylinder. The first pressurized cylinder and the second pressurized cylinder may be coupled to the first frame. The third pressurized cylinder and the second pressurized cylinder may be coupled to the second frame. The base may include a pad eye. The upper track conveyer system may include an upper metal conveyer belt having an array of gripping pads. The lower track conveyer system may include an upper metal conveyer belt having an array of gripping pads In one aspect, the pipe rack pipe pusher includes a base. A first frame is coupled to the base. A second frame is coupled to the base. A first pressurized cylinder is coupled to the base. A second pressurized cylinder is coupled to the base. A third pressurized cylinder is coupled to the base. A fourth pressurized cylinder is coupled to the base. A lower track conveyer system is coupled to the base and positioned between the first frame and the second frame. An upper track conveyer system is coupled to the pressurized cylinders and positioned between the first frame and the second frame. A motor is coupled to the upper track conveyer system, the lower track conveyer system, and the pressurized cylinders. A pipe is positioned between the upper track conveyer system and the lower track conveyer system. A control operation unit is coupled to the motor.

Implementation may include one or more of the following. A first spring system may be coupled to the upper track conveyer system and the first pressurized cylinder. A second spring system may be coupled to the upper track conveyer system and the second pressurized cylinder. A third spring system may be coupled to the upper track conveyer system and the third pressurized cylinder. A fourth spring system may be coupled to the upper track conveyer system and the fourth pressurized cylinder. The first pressurized cylinder and the second pressurized cylinder may be coupled to the first frame. The third pressurized cylinder and the second pressurized cylinder may be coupled to the second frame. The base may include a pad eye. The upper track conveyer system may include an upper metal conveyer belt having an array of gripping pads. The lower track conveyer system may include an upper metal conveyer belt having an array of gripping pads.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A push rack pipe pusher comprising:
a base;
a first frame coupled to the base;
a second frame coupled to the base;
a first pressurized cylinder coupled to the base;
a second pressurized cylinder coupled to the base;
a third pressurized cylinder coupled to the base;
a fourth pressurized cylinder coupled to the base;
a lower track conveyer system coupled to the base and positioned between the first frame and the second frame;
an upper track conveyer system coupled to the pressurized cylinders and positioned between the first frame and the second frame; and
a control unit coupled to the upper track conveyer system, the lower track conveyer system, and the pressurized cylinders.

2. The push rack pipe pusher of claim 1 further comprising:
a first spring system coupled to the upper track conveyer system and the first pressurized cylinder;
a second spring system coupled to the upper track conveyer system and the second pressurized cylinder;
a third spring system coupled to the upper track conveyer system and the third pressurized cylinder; and
a fourth spring system coupled to the upper track conveyer system and the fourth pressurized cylinder.

3. The push rack pipe pusher of claim 1 wherein the first pressurized cylinder and the second pressurized cylinder are coupled to the first frame.

4. The push rack pipe pusher of claim 1 wherein the third pressurized cylinder and the second pressurized cylinder are coupled to the second frame.

5. The push rack pipe pusher of claim 1 wherein the base includes a pad eye.

6. The push rack pipe pusher of claim 1 wherein the upper track conveyer system includes an upper metal conveyer belt having an array of gripping pads.

7. The push rack pipe pusher of claim 1 wherein the lower track conveyer system includes a lower metal conveyer belt having an array of gripping pads.

8. A method of pushing a pipe comprising:
coupling a base to a first frame and a second frame;
coupling a lower track conveyer system to the base and positioned between the first frame and the second frame;
coupling a first pressurized cylinder, a second pressurized cylinder, a third pressurized cylinder, and a fourth pressurized cylinder to the base;
coupling an upper track conveyer system to the pressurized cylinders and to the first frame and the second frame, such that the upper track conveyer system is positioned between the first frame and the second frame;
coupling a control unit to the lower track conveyer system, the upper track conveyer system, and the pressurized cylinders;
inserting a pipe between the upper track conveyer system and the lower track conveyer system;
initiating the control unit to lower the upper track conveyer system onto the pipe; and
using the control unit to operate the upper track conveyer system and the lower track conveyer system to push the pipe.

9. The method of pushing a pipe in claim 8 further comprising:
a first spring system coupled to the upper track conveyer system and the first pressurized cylinder;
a second spring system coupled to the upper track conveyer system and the second pressurized cylinder;
a third spring system coupled to the upper track conveyer system and the third pressurized cylinder; and
a fourth spring system coupled to the upper track conveyer system and the fourth pressurized cylinder.

10. The method of pushing a pipe in claim 8 wherein the first pressurized cylinder and the second pressurized cylinder are coupled to the first frame.

11. The method of pushing a pipe in claim 8 wherein the third pressurized cylinder and the second pressurized cylinder are coupled to the second frame.

12. The method of pushing a pipe in claim 8 wherein the base includes a pad eye.

13. The method of pushing a pipe in claim 8 wherein the upper track conveyer system includes an upper metal conveyer belt having an array of gripping pads.

14. The method of pushing a pipe in claim 8 wherein the lower track conveyer system includes a lower metal conveyer belt having an array of gripping pads.

15. A push rack pipe pusher system comprising:
   a base;
   a first frame coupled to the base;
   a second frame coupled to the base;
   a first pressurized cylinder coupled to the base;
   a second pressurized cylinder coupled to the base;
   a third pressurized cylinder coupled to the base;
   a fourth pressurized cylinder coupled to the base;
   a lower track conveyer system coupled to the base and positioned between the first frame and the second frame;
   an upper track conveyer system coupled to the pressurized cylinders and positioned between the first frame and the second frame;
   a control unit coupled to the upper track conveyer system, the lower track conveyer system, and the pressurized cylinders; a
   pipe positioned between the upper track conveyer system and the lower track conveyer system; and
   a motor coupled to the control unit.

16. The push rack pipe pusher system of claim 15 further comprising:
   a first spring system coupled to the upper track conveyer system and the first pressurized cylinder;
   a second spring system coupled to the upper track conveyer system and the second pressurized cylinder;
   a third spring system coupled to the upper track conveyer system and the third pressurized cylinder; and
   a fourth spring system coupled to the upper track conveyer system and the fourth pressurized cylinder.

17. The push rack pipe pusher system of claim 15 wherein the first pressurized cylinder and the second pressurized cylinder are coupled to the first frame.

18. The push rack pipe pusher system of claim 15 wherein the third pressurized cylinder and the second pressurized cylinder are coupled to the second frame.

19. The push rack pipe pusher system of claim 15 wherein the upper track conveyer system includes an upper metal conveyer belt having an array of gripping pads.

20. The push rack pipe pusher system of claim 15 wherein the lower track conveyer system includes a lower metal conveyer belt having an array of gripping pads.

* * * * *